us005938249A

United States Patent [19]
Kim

[11] Patent Number: 5,938,249
[45] Date of Patent: Aug. 17, 1999

[54] APPARATUS FOR OPENING AND DETACHING A PANEL

[75] Inventor: Seung-Seob Kim, Kyunggi-Do, Rep. of Korea

[73] Assignee: Daewoo Electronics Co., Ltd., Seoul, Rep. of Korea

[21] Appl. No.: 08/775,343

[22] Filed: Jan. 3, 1997

[30] Foreign Application Priority Data

Apr. 30, 1996 [KR] Rep. of Korea .................. 96-9962
Apr. 30, 1996 [KR] Rep. of Korea .................. 96-13631

[51] Int. Cl.$^6$ .............. G11B 33/02; H04B 1/08; H05K 11/02; E05S 17/00
[52] U.S. Cl. ............. 292/110; 292/113; 292/121; 292/196
[58] Field of Search .................... 292/113, 110, 292/109, 196, 263, DIG. 72, 121

[56] References Cited

U.S. PATENT DOCUMENTS 5,127,683  7/1992  Sato et al. ................... 292/113

FOREIGN PATENT DOCUMENTS 0 401 475 A2  9/1990  European Pat. Off. .

*Primary Examiner*—Alex Grosz
*Attorney, Agent, or Firm*—Nixon & Vanderhye P.C.

[57] ABSTRACT

An apparatus for opening and detaching a panel has a rotating plate rotatively installed in an escutcheon of a car audio. The rotating plate is secured to the escutcheon by fastening the fastened protrusion of the rotating plate with a locking portion installed in an upper side of one side of a rear face of the escutcheon. A detaching portion is secured to one side of the rear face of the rotating plate. A panel is secured to the rotating plate by fastening the rear face of the panel with the detaching portion. When the rotating plate is released from the escutcheon, an elastic portion secured to the lower one side of the rotating plate elastically opens the rotating plate. A speed reducing portion secured between the escutcheon and the rotating plate reduces the rotating speed of the rotating plate.

10 Claims, 4 Drawing Sheets

Pen recorder

APPARATUS FOR OPENING AND DETACHING A PANEL

BACKGROUND OF THE INVENTION

1. Field of the Invention

The present invention relates to an apparatus for opening and detaching a panel, and, more particularly, to an apparatus for opening and detaching a panel of a car audio device in which the panel may be opened and closed for inserting a recording medium into a recording medium inserting slot and ejecting a recording medium from a recording medium inserting slot and the panel is to be detached and attached from a front face of the car audio body for discouraging a possible theft.

2. Description of the Prior Art

Recently developed audio devices are generally compact. Audio devices installed in a car or the like must be especially compact and thin due to space limitations. The panel installed in the front side of the audio device comprises a liquid crystal display (hereinafter, referred as LCD) to display information about the operation of the audio device, function knobs to indicate the operation, a recording medium inserting slot, and the like. Recently, a number of panel detaching apparatuses to prevent a car audio from being stolen have been proposed. When a driver leaves his or her car installed with a car audio having a removable panel, a driver may remove a removable panel from an escutcheon. If a car audio should be stolen, a car audio cannot be used without a panel. Therefore, a panel detaching apparatus discourages a possible theft by detaching a removable panel from an escutcheon.

Figure 1:
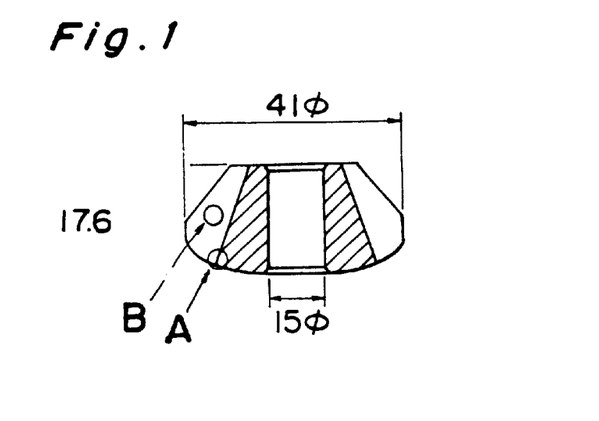
FIG. 1 is a side view of the conventional panel detaching device.
Figure 2:
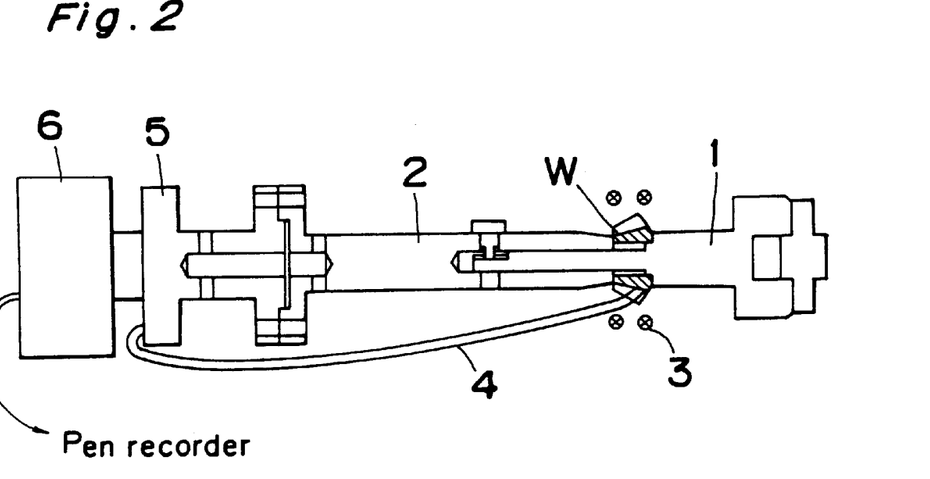
FIG. 2 is a plane view of the conventional panel detaching device in a mounted condition.

In the appended figures, FIG. 1 is a side view of a panel detaching apparatus such as disclosed in U.S. Pat. No. 5,127,683, and FIG. 2 is a plan view of the panel when the panel detaching apparatus is installed on the car audio apparatus.

Reference symbol A represents an audio equipment body, and reference symbol B represents a panel. At the front of the audio equipment body A is formed a hollow portion 2 that accommodates the panel B. On one side of the hollow portion 2 is formed an inwardly projecting strip 3 that is adapted to fit into an engagement recess 1 of the panel B. At the rear of the hollow portion 2 in the audio equipment body A, a shaft 11 is provided on which a first arm 12 is rotatable. A first arm 12 is urged toward the hollow portion 2 by a torsion spring 13 wound on the shaft 11.

The first arm 12 has a holder 14 mounted thereon through a shaft 15. The holder 14 also has a shaft 16 on which is supported an engagement claw 17 that has a claw portion 17a to fit into an engaging recess of the panel B and is rotatable.

Wound on the shaft 16 is a torsion spring 18 whose ends are engaged with the holder 14 and the engagement claw 17 for urging the claw portion 17a of the engagement claw 17 to fit in the engaging recess.

On the back of the hollow portion 2, a shaft 19 is secured to a support piece 19a at a position farther away from the hollow portion 2 than the shaft 11 and close to the end of the first arm 12. The shaft 19 and a shaft 20 of the holder 14 are connected together by a second arm 21.

The first arm 12 has a stopper pin 22 erected thereon, and a support plate having a vertically disposed shaft is mounted at the back of the hollow portion 2.

On the shaft of the support plate is supported a rotating plate 25 that has an engagement notch 25a to engage with the stopper pin 22. A torsion spring 26 wound on the shaft and engaged with the support plate urges the rotating plate 25 in a direction that causes the engagement notch 25a to engage with the stopper 22.

The rotating plate 25 is connected with a link plate 28 that is mounted on a push button 27, and projects from the front surface of the audio equipment body A. When the push button 27 is depressed, the rotating plate 25 is rotated against the force of the torsion spring 26 so as to disengage its engagement notch 25a from the stopper pin 22.

When the push button 27 is stopped being pressed and then released, the rotating plate 25 is rotated by the torsion spring 26 until it s engagement portion 25b comes into contact with a stopper arm 24a of the support plate. The rotating plate 25, while rotating, pushes back the push button 27 and then stops.

Next, the procedure for removing the panel B from the audio equipment body A will be explained.

First, when the push button 27 is pressed, the rotating plate 25 is rotated so as to release the stopper pin 22 from the engagement notch 25a, and then the first arm 12 is rotated by the torsion spring 13 in a direction that pushes the panel B out of the equipment body A.

Then, the holder 14 connected to the first arm 12 through the shaft 15 departs from the audio equipment body A together with the engagement claw 17 mounted on the holder 14 through the shaft 16.

Since the shaft 20 of the holder 14 is connected with the second arm 21, the shaft 20 of the holder 14 moves along a locus of the second arm 21.

The panel B is urged downwardly in FIG. 2 by the rotation of the first arm 12, so that the panel B rotates about an engagement point between the engagement recess 1 and the protruded strip 3.

At this time, since the claw portion 17a of the engagement claw 17 is disengaged in the engaging recess of the panel B, it moves along a locus of an arc about the engagement point of the engagement recess 1.

Also at the same time, the holder 14 and the engagement claw 17 are returned to the original position by the torsion spring 18.

The panel B is pushed downward in FIG. 2 for disconnecting the protruded strip 3 from the engagement recess 1, and is released from the audio equipment body A.

However, the conventional panel detaching apparatus requires a number of members for connecting the push button and the engagement claw. Therefore, the number of procedures required when the user attaches the panel detaching apparatus to the car stereo body is increased. Accordingly, it takes inordinate time for the user to attach the panel detaching apparatus.

Also, the conventional panel detaching apparatus is arranged with the connection members from the push button to the engagement claw in a longitudinal direction of the panel. Thus, a wide space of the panel detaching apparatus is required.

Also, the construction of the panel is complex due to the front face having the recording medium inserting slot.

SUMMARY OF THE INVENTION

The present invention has been proposed to overcome the above described problems in the prior art, and accordingly, it is an object of the present invention to provide an apparatus for opening and detaching a panel for easily detaching the panel from the car audio body by using simple members for preventing a theft of the audio device.

It is another object of the present invention to provide an apparatus for opening and detaching a panel.

It is another object of the present invention to provide an apparatus for opening and detaching a panel to insert a recording medium into the car audio device and eject the recording medium from the car audio device by opening and closing the panel.

To achieve the above objects, the apparatus for opening and detaching a panel according to the present invention comprises a rotating plate having an edge connected with an escutcheon and rotating integrally with a panel centering on an axis of the connected edge, the rotating plate being detachably connected with a rear face of the panel for opening and closing a recording medium inserting slot of a car audio in order to insert a recording medium into the recording medium inserting slot and eject the recording medium from the recording medium inserting slot;

a locking portion for fastening the other edge of the rotating plate when said recording medium inserting slot is closed by the rotating plate to prevent the a rotation of the rotating plate and to safely connect the rotating plate with the escutcheon of the car audio; and a detaching portion installed on the rear face of the rotating plate and for detachably connecting the panel with the rotating plate due to an elastic force and a restoration force of the detaching portion.

The apparatus for opening and detaching the panel according to the present invention further comprises an elastic opening portion connected with one side of the rotating plate and one side of the escutcheon for elastically opening the rotating plate by the restoration force. The apparatus for opening and detaching the panel according to the present invention further comprises a speed reducing portion connected between the rotating plate and the escutcheon is also provided for reducing the rotating speed when the rotating plate is rotated.

According to this construction, the panel is secured to the rotating plate by hooking the rear face of the panel with the detaching portion. The rotating plate is secured to the escutcheon by the locking portion. The rotating plate secured the panel thereon is slowly rotated by the elastic opening portion and the speed reducing portion.

When the user pushes the detachment button, the panel is released from the rotating plate by the detaching portion. Therefore, the panel may be detached from the rotating plate, and may be portable.

The apparatus for opening and detaching a panel according to the present invention has no other connection members which are connected between the detachment knob for detaching the panel from the rotating plate and the detaching portion and between the ejection knob for opening and closing the rotating plate and the locking portion. Also, the detaching portion and the locking portion have a simple construction. Therefore, the number of procedures required when the user attaches the detaching portion and the locking portion on the car audio body is decreased. Accordingly, it takes minimal time for the user to attach the detaching portion and the locking portion on the car audio body.

Secondly, the panel is easily detached from the body for preventing the theft of the audio device.

Thirdly, the detaching portion and the locking portion are compact. Thus, the space required from the detaching portion and locking portion is reduced.

Fourth, the recording medium inserting slot is opened and closed according to the rotation of the rotating panel by the locking portion.

Finally, the panel is prevented from being vibrated and from being separated from the escutcheon because the panel is installed on the escutcheon by the detaching portion and the locking portion. Thus, although the car body is joggled, the car audio is dependable since the panel is firmly secured to the escutcheon.

BRIEF DESCRIPTION OF THE DRAWINGS

The present invention will be better understood, and its various objects and advantages will be more fully appreciated from the following description taken in conjunction with the accompanying drawings, in which.

DETAILED DESCRIPTION OF THE PREFERRED EMBODIMENT

Figure 3:
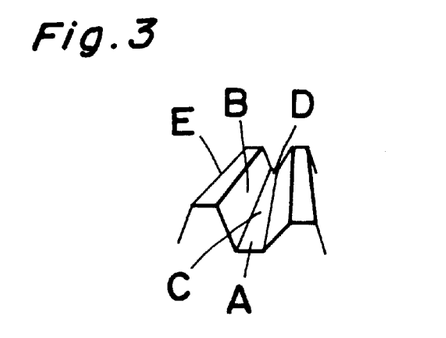
FIG. 3 is a perspective exploded view of an apparatus for opening and detaching a panel according to the present invention.
Figure 4:
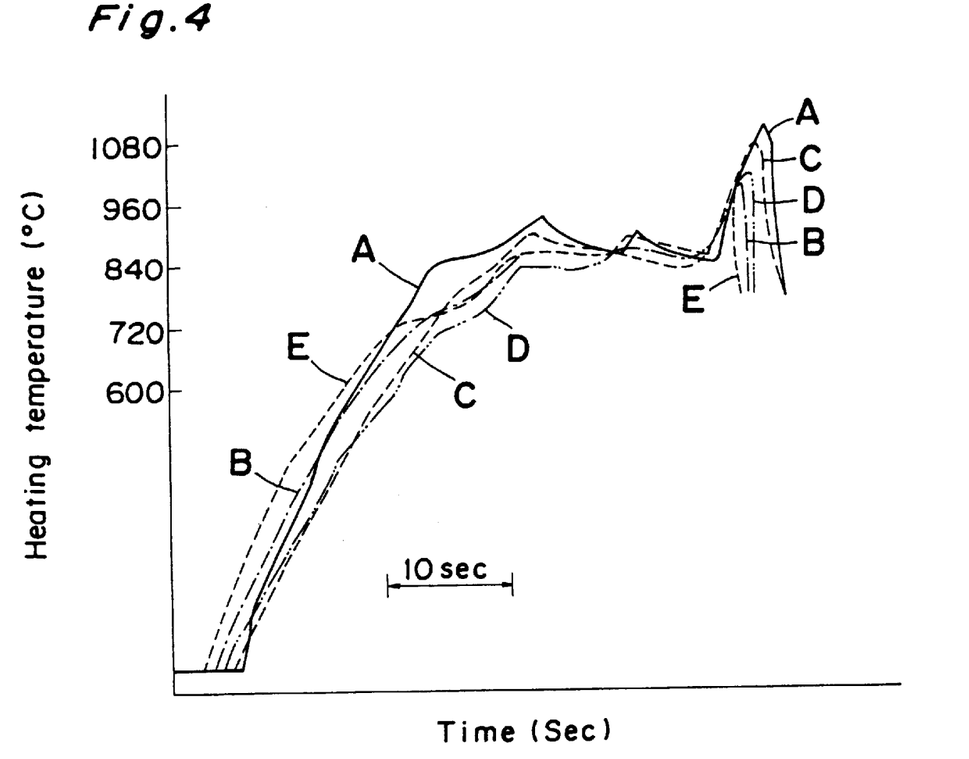
FIG. 4 is a perspective exploded view of the locking portion of an apparatus for opening and detaching a panel according to the present invention.
Figure 5:
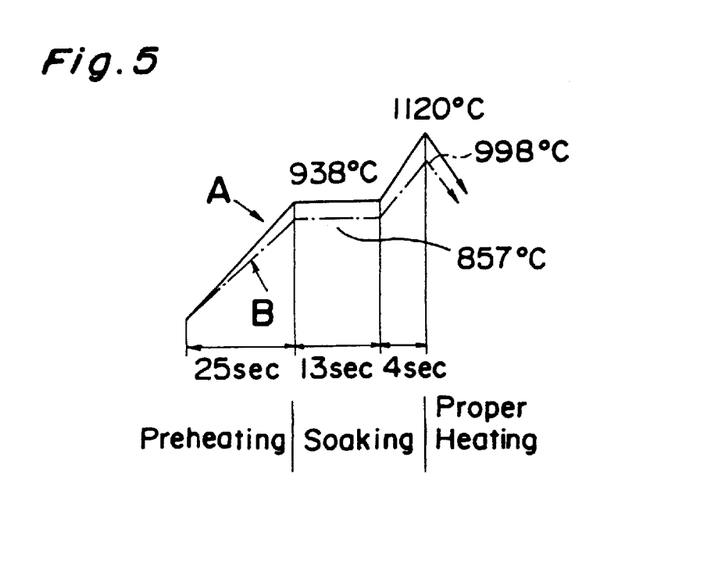
Figure 6:
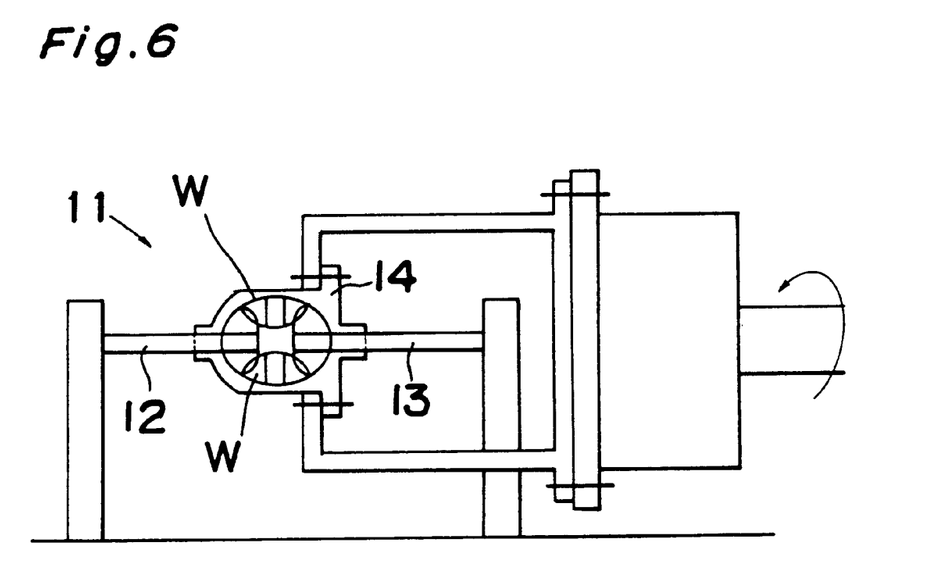
Figure 7A:
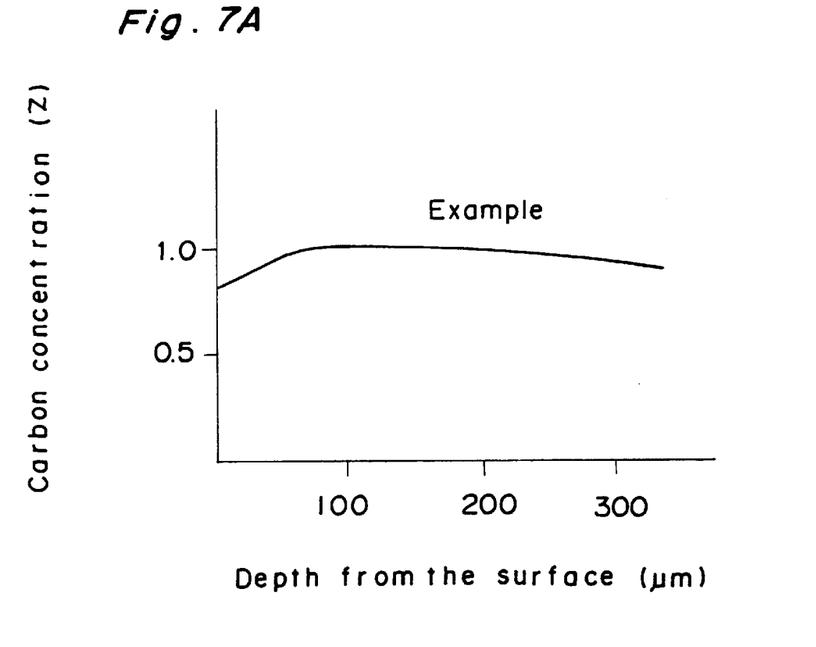
Figure 7B:
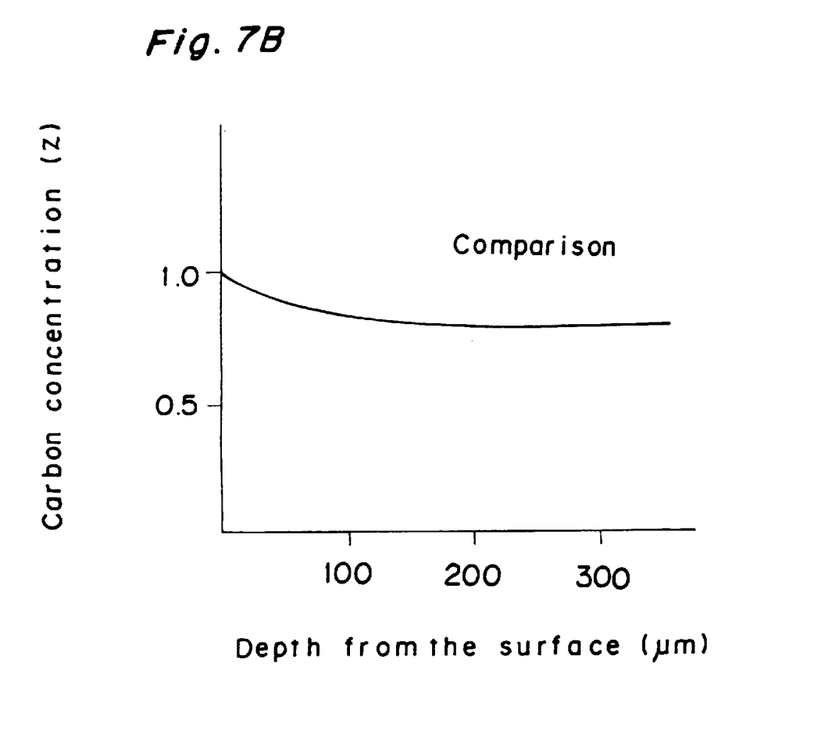

Hereinafter, the construction of an apparatus for opening and detaching the panel according to the present invention will be described in detail with reference to FIG. 3 and FIG. 4.

An escutcheon 100 is formed at a front side of the car audio body (not shown) accommodated in the dash board (not shown) of a car. A recording medium inserting slot 160 for inserting the recording medium in the car audio is formed at a front side of the escutcheon 100 to reproduce the recorded information.

A rotating plate 200 has an edge connected with the escutcheon 100 and is rotated on the edge for inserting and ejecting the recording medium in the car audio. The rotating plate 200 is detachably installed at in a rear face of the panel 300.

A locking portion 400 is installed on the rear face of the escutcheon 100 for fixing the rotating plate 200 at the escutcheon 100. When the rotating plate 200 closes the recording medium inserting slot 160, the locking portion 400 locks one of the other edges of the rotating plate 200 without a rotatable connection in order to prevent the rotating plate 200 from being rotated.

A detaching portion 500 is installed at the rear face of the rotating plate 200 for detachably connecting the panel 300 with the rotating plate 200.

The panel 300 comprises a front face having an eject knob 320, a detachment knob, and a fastened groove 360. The eject knob 320 releases the rotating plate 200 from the locking portion 400 when the recording medium is inserted into and is ejected from the car audio. The detachment knob 340 releases the detaching portion 500 from the panel 300 when the panel 300 is detached from the rotating plate 200. The fastened groove 360 connects the panel 300 with the rotating plate 200 formed at a side face in a longitudinal direction of the panel 300. A fixing groove (not shown in figures) at the rotating plate 300 is formed at a predetermined position on the rear face of the panel 300. The detaching portion 500 is inserted to the fixing groove in order to fix the panel 300 at the rotating plate 200.

The detaching portion 500 has a pushed part 520 pushed by the detachment knob 340 to release the panel 300 from the rotating plate 200. Fixing members 540 for fastening the panel 300 to the rotating plate 200 are integrally formed at an upper part and a lower part of the pushed part 520. Supporting portions 560 capable of receiving a detaching portion fixing shaft 590 are integrally formed with the fixing members 540. The detaching portion 500 is installed at the rotating plate 200 by the detaching portion fixing shaft 590. A spring member 580 is installed between the supporting portions 560 to receive the detaching portion fixing shaft 590 therein. Also, the pushed part 520 and the rotating plate 200 are pushed by an elastic force of the spring member 580 for returning the fixing members 540 to the original position when the panel 300 is detached from the rotating plate 200.

The locking portion 400 has a supporting member 420 for fixing the locking portion 400 at the escutcheon 100. A pushed member 440 is installed at one side of the supporting member 420. The pushed member 440 is operated without relation to the supporting member 420. The pushed member 440 is connected to one side of a cover 460. The cover 460 accommodates the supporting member 420 and the pushed member 440. The cover 460 is rotated depending on the rotation of the pushed member 440. A locking member 480 is secured to the other side of the cover 460 and is rotated depending on the rotation of the cover 460, so that the locking member 480 fastens the rotating plate 200. One side of the supporting member 420 is connected to one side of the cover 460 by a spring member 490 for returning the locking member 480 to the original position when the rotating plate 200 is released from the locking member 480.

A supporting wall 421 of the supporting member 420 has a fixing hole 424 at a position corresponding with a boss formed in a rear face of the escutcheon 100 to fasten the supporting member 420 to the escutcheon 100. Each of side walls 423 is folded and extended from each of the longitudinal sides of the supporting wall 421. A rotating shaft 470 inserted through shaft engagement holes 422. The supporting wall 421 is extended toward the lower direction to a predetermined length. A fixing protrusion 426 is integrally protruded from an edge of the extended part for fixing one side of the spring member 490.

An engagement hole 442 for fixing the pushed member 440 at the supporting member 420 is formed at a position corresponding to the shaft engagement holes 422 in an engagement plate 448 of the pushed member 440. A pushed piece 444 is folded from one side of the engagement plate 448 and is integrally extended to be contacted with the ejection knob 320. In the other side of the engagement plate 448 is formed a pushed member fixing piece 446 folded and extended toward the direction corresponding to the pushed piece 444 for fixing the pushed member 440 at one side wall of the cover 460.

The cover 460 comprises a pushed member fixing wall 465 for fixing the pushed member 440 to the cover 460. The pushed member fixing wall 465 has a slit 466 for receiving the pushed member fixing piece 446 and cover engagement holes 464 at a position corresponding to the engagement hole 442. A ceiling 463 for accommodating the supporting member 420 is folded and extended from the upper edge of the pushed member fixing wall. A locking member fixing wall 467 is folded and integrally extended with the ceiling 463 in the opposite direction of the pushed member fixing wall 465.

Cover engagement holes 464 and a locking member fixing hole 468 for fixing the locking member 480 at the cover 460 are formed at a position corresponding to the shaft engagement holes 422 on the locking member fixing wall 467. The other side of the spring member 490 is secured to an elastic member fixing protrusion 462 protruding from the lower edge of the locking member fixing wall 467.

The locking member 480 comprises a locking plate 483 and a hook 486. The hook 486 is extended from one side of the locking plate 483 toward the panel 300 and is downward folded from the extended end for hooking the rotating plate 200 so as to fix the rotating plate 200 at the escutcheon 100. In the locking plate 483, a locking member connecting hole 482 is formed at a position corresponding to the cover engagement holes 464, and a locking plate fixing hole 484 is formed at a position corresponding to the locking member fixing hole 468 for fixing the locking member 480 at the cover 460.

In the escutcheon 100, the hook 486 of the locking member 480 is pierced through a first inserting hole 114, and the pushed piece 444 is pierced through a second inserting hole 116. A first bracket 120 and a second bracket 130 for connecting the rotating plate 200 with the escutcheon 100 are installed in lower both sides of the escutcheon 100, and the rotating plate 200 is rotated toward the panel 300. The first bracket 120 has a third fastened protrusion 122 formed at the position toward the escutcheon 100. Also, the escutcheon 100 has a sunken portion 140 for accommodating the detaching portion 500.

The eject knob 320 passes through a passing hole 282 formed in the rotating plate 200 for pushing the pushed piece 444 of the locking portion 400. Fixing members 540 of the detaching portion 500 pass through windows 284 formed in a position corresponding to fixing holes (not shown) of the panel 300 for fixing the panel 300 at the rotating plate 200. Fixing leaves 286 for fixing the detaching portion 500 at the rotating plate 200 are formed in the upper side and the lower side of the windows 284. The fixing leaves 286 are folded toward the escutcheon 100 and integrally extended.

A first hinge connecting piece 220 and a second hinge connecting piece 230 are folded toward the panel 300 and integrally formed in both sides of the rotating plate 200 for connecting the first bracket 120 and the second bracket 130. A fastening portion 240 for connecting the panel 300 and the rotating plate 200 by inserting the fastening portion 240 into the fastened groove 360 of the panel 300 is protruded in an upper side of the first hinge connecting piece 220. A fastening protrusion 260 for fixing the rotating plate 200 at the escutcheon 100 is formed in a position upper than the fastening portion 240. The hook 486 of the locking portion 400 fastens on the fastened protrusion 260. The rotating plate 200 also comprises a guiding sill 290 folded from upper and lower edges of the rotating plate 200 toward the panel 300 for guiding the panel 300. The first hinge connecting piece 220 has a fifth fastened protrusion 223 protruded toward the first bracket 120.

The speed reducing portion 700 comprises a gear 720 having gear teeth formed in predetermined length so that the rotating plate 200 may be rotated in the range of predetermined angle, an idler 740, and a damping gear 760 for reducing the rotating speed of the rotating plate 200.

The assembling procedure and operation of the panel detaching apparatus according to the present invention will be described.

First, the pushed member fixing piece 446 of the pushed member 440 is inserted into the slit 466 of the cover 460. The supporting member 420 is inserted into opening of the cover 460 so as to fit together with the shaft engagement holes 422, the cover engagement holes 464, and the locking member connecting hole 482. Next, the locking member 480 is contacted with the cover 460. The rotating shaft 470 is inserted through the fitted shaft engagement holes 422, the cover engagement holes 464, and the locking member connecting hole 482. User screws the locking member 480 on the cover 460. Both sides of the spring member 490 are hooked and secured to the elastic member fixing protrusion 462 and the fixing protrusion 426.

The assembled locking portion 400 is secured to the boss 112. The first bracket 120 and the second bracket 130 are secured to the front both sides of the escutcheon 100. The idler 740 is rotatively installed in the second bracket 130.

The first bracket 120 and the second bracket 130 are connected with the first hinge connecting piece 220 and the second hinge connecting piece 230. The gear 720 is installed in the second hinge connecting piece 230 for engaging the gear 720 with the idler 740. In the first hinge connecting piece 220, the ends of the third spring member 620 are connected with a fifth fastened protrusion 223 and a third fastened protrusion 122. The third spring member 620 urges the rotating plate 200 by its elasticity.

Also, the detaching portion fixing shaft 590 is inserted into the fixing leaves 286 of the rotating plate 200, so that the detaching portion 500 is rotatively installed in the rotating plate 200. The spring member 580 installed in the detaching portion 500 urges the rotating plate 200 and the pushed part 520 by its elasticity.

After the rotating plate 200 is installed in the escutcheon 100, the rear face of the rotating plate 200 urges toward the front face of the escutcheon 100 due to the rotation of the rotating plate 200. The hook 486 of the locking portion 400 is inserted into the first inserting hole 114 of the escutcheon 100 and fastens the fastening protrusion 260 formed on the upper part of side face of the rotating plate 200. Thus, the rotating plate 200 is accommodated and secured to the escutcheon 100. At this time, the detaching portion 500 is accommodated in the sunken portion 140 of front face of the escutcheon 100.

Under this condition, when the fastening portion 240 of the rotating plate 200 is inserted into the fastened groove 360, and the panel 300 is pushed toward the direction of the rotating plate 200, the fixing members 540 of the detaching portion 500 fastens the fixing groove (not shown) formed in rear face of the panel 300 so as to fix the panel 300 at the rotating plate 200. The guiding sill 290 folded from the rotating plate 200 accommodates upper and lower edges of the panel 300.

Also at the same time, when user wants to use the cassette deck of the car audio installed with the panel 300, user urges the eject knob 320 installed on the panel 300. The eject knob 320 pushes the pushed member 440 of the locking portion 400. The fastening protrusion 260 of the rotating plate 200 releases from the hook 486 of the locking member 480.

The gears of the speed reducing portion 700 are engaged with each other and are rotated by the restoration force of the third spring member 620. Thus, the rotating plate 200 rotates in slow due to restoration of the third spring member 620, and then the recording medium inserting slot 160 is opened.

After inserting the recording medium into the recording medium inserting slot 160 installed in the front face of the escutcheon 100, the rotating plate 200 is pushed toward the escutcheon 100 and is secured by the locking portion 400.

In the apparatus for opening and detaching a panel in the present invention described above, the connection between the detachment knob and the detaching portion and the connection between the eject knob and the locking portion are simple. Also, the detaching portion and the locking portion have simple constructions. Thus, the number of procedures required when the user attaches the detaching portion and the locking portion on the car audio body is decreased. Accordingly, it takes minimal time for the user to attach the detaching portion and the locking portion on the car audio body.

Secondly, the detaching portion and locking portion are compact. Therefore, the space required from the detaching portion and locking portion is reduced.

Thirdly, the panel is easily detached from the body for preventing the theft of the audio device.

Finally, the detaching portion and the locking portion insulates the panel from outside vibration and to be separated from the escutcheon because the panel is installed in the escutcheon by the detaching portion and locking portion. Thus, although the car body is joggled, the car audio is safely operated due to the panel being firmly secured to the escutcheon.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. An apparatus for opening and detaching a panel comprising:

a rotating plate 200 having an edge connected with an escutcheon 100 and being rotated integrally with a panel 300 centering on an axis of the edge, said rotating plate 200 being detachably connected with a rear face of said panel 300 for opening and closing a recording medium inserting slot 160 of a car audio in order to insert a recording medium into the recording medium inserting slot 160 and eject a recording medium from the recording medium inserting slot 160;

a locking portion 400 for fastening the other edge of said rotating plate 200 when said recording medium inserting slot 160 is closed by said rotating plate 200 to prevent said rotating plate 200 from being rotated and to firmly connect said rotating plate 200 with said escutcheon 100 of said car audio;

a detaching portion 500 installed on the rear face of said rotating plate 200 and for detachably connecting said panel 300 with said rotating plate 200 due to an elastic force and a restoration force of the detaching portion 500;

an elastic portion 620 connected with one side of said rotating plate 200 and one side of said escutcheon 100 for elastically opening said rotating plate 200 by the restoration force thereof when said rotating plate 200 is rotated; and a speed reducing portion 700 having gears 720 engaged with said rotating plate 200 and said escutcheon 100 and for reducing the rotating speed of said rotating plate 200 when said rotating plate 200 is rotated.

2. The apparatus for opening and detaching a panel according to claim 1, wherein said detaching portion 500 comprises:

a pushed part 520 urged by a detachment knob 340 to release said panel 300 from said rotating plate 200;

fixing members 540 integrally formed with the upper and lower parts of said pushed part 520 and for fastening said panel 300 to said rotating plate 200 by hooking said panel 300;

supporting portions 560 integrally formed with said fixing members 540 to receive a detaching portion fixing shaft 590 and for fixing said detaching portion 500 at said rotating plate 200; and a spring member 580 installed between said supporting portions 560 to receive said detaching portion fixing shaft 590 therein and to urge the rear faces of said pushed part 520 and said rotating plate 200 and for returning said fixing members 580 to the original position when said panel 300 is detached from said rotating plate 200.

3. The apparatus for opening and detaching a panel according to claim 1, wherein said locking portion 400 comprises:

a supporting member 420 for fixing said locking portion 400 at a boss 112 formed on a rear face of said escutcheon 100;

a pushed member 440 contacted with one face of said supporting member 420 and movably connected with and separately operated with said supporting member 420;

a cover 460 for accommodating said supporting member 420 and said pushed member 440 and having its one side connected with said pushed member 440, so that said cover 460 is rotated according to the rotation of said pushed member 440;

a locking member 480 secured to the other side of said cover 460 and for fastening said rotating plate 200 according to the rotation of said cover 460; and an elastic member 490 secured to one side of said supporting member 420 and one side of said cover 460 and for returning said locking member 400 to original position when said rotating plate 200 is released from said locking member 400.

4. The apparatus for opening and detaching a panel according to claim 3, wherein said supporting member 420 comprises:

a supporting wall 421 forming a fixing hole 424 at a position corresponding to said boss 112 therein for fastening said supporting member 420 at said escutcheon 100 and having a fixing protrusion 426 protruded from an edge of said supporting wall 421 for fixing one side of said elastic member 490 in the longitudinal direction; and side walls 423 forming shaft engagement holes 422 to receive a rotating shaft 470 therethrough and folded and extended from the longitudinal both sides of said supporting wall 421.

5. The apparatus for opening and detaching a panel according to claim 4, wherein said pushed member 440 comprises:

an engagement plate 448 forming an engagement hole 442 at a position corresponding to said shaft engagement holes 422 and for fixing said pushed member 440 at said supporting member 420;

a pushed piece 444 folded from one side of said engagement plate 448 and integrally extended toward an opposite direction of said supporting member 420, so that said pushed piece 444 is urged for releasing said rotating plate 200 from said locking portion 400; and a pushed member fixing piece 446 folded and extended from a side of said engagement plate 448 toward the same direction of said pushed piece 444 for fixing said engagement plate 448 at one side wall of said cover 460.

6. The apparatus for opening and detaching a panel according to claim 5, wherein said cover 460 comprises:

a pushed member fixing wall 465 forming a slit 466 for receiving said pushed member fixing piece 446 therethrough so as to secure said pushed member 440 to said cover 460 and cover engagement holes 464 at a position corresponding to said engagement hole 442 for rotating said cover 460 according to the rotation of said pushed member 440; and a locking member fixing wall 467 integrally extended from said pushed member fixing wall 465 and confronting said pushed member fixing wall 465, and forming cover engagement holes 464 at the position corresponding to said shaft engagement hole 422 and a locking member fixing hole 468 for fixing said locking member 480 at said cover 460; and wherein said locking member fixing wall 467 has an elastic member fixing protrusion 462 protruded from the front side of locking member fixing wall's lower edge for fastening one end of said elastic member 490.

7. The apparatus for opening and detaching a panel according to claim 6, wherein said locking member 480 comprises:

a locking plate 483 forming a locking member engagement hole 482 at the position corresponding to said cover engagement holes 464 for connecting said locking member 480 and said cover 460, and a locking plate fixing hole 484 at the position corresponding to said locking member fixing hole 468 for fixing said locking member 480 at said cover 460; and a hook 486 folded and integrally extended downwardly from one side of said locking plate 483 for fixing said rotating plate 200 at said escutcheon 100 by fastening said rotating plate 200.

8. An apparatus for opening and detaching a panel comprising:

a rotating plate 200 having an edge connected with an escutcheon 100 and rotating integrally with a panel 300 centering on an axis like the connected edge, said rotating plate 200 being detachably connected with a rear face of said panel 300 for opening and closing a recording medium inserting slot 160 of a car audio in order to insert a recording medium into the recording medium inserting slot 160 and eject a recording medium from the recording medium inserting slot 160;

a locking portion 400 for fastening the other edge of said rotating plate 200 when said recording medium inserting slot 160 is closed by said rotating plate 200 to prevent a rotation of said rotating plate 200 and to firmly connect said rotating plate 200 with said escutcheon 100 of said car audio; and a detaching portion 500 installed on the rear face of said rotating plate 200 and for detachably connecting the panel 300 with said rotating plate 200 due to an elastic force and a restoration force of the detaching portion 500;

wherein said detaching portion 500 comprises:

a pushed part 520 urged by a detachment knob 340 to release said panel 300 from said rotating plate 200;

fixing members 540 integrally formed with the upper and lower parts of said pushed part 520 and for fastening said panel 300 to said rotating plate 200 by hooking said panel 300;

supporting portions 560 integrally formed with said fixing members 540 to receive a detaching portion fixing shaft 590 and for fixing said detaching portion 500 at said rotating plate 200; and a spring member 580 installed between said supporting portions 560 to receive said detaching portion fixing shaft 590 therein and to urge the rear faces of said pushed part 520 and said rotating plate 200 and for returning said fixing members 580 to the original position when said panel 300 is detached from said rotating plate 200.

9. An apparatus for opening and detaching a panel comprising:

a rotating plate 200 having an edge connected with an escutcheon 100 and rotating integrally with a panel 300 centering on an axis of the connected edge, said rotating plate 200 is detachably connected with a rear face of said panel 300 for opening and closing a recording medium inserting slot 160 of a car audio in order to insert a recording medium into the recording medium inserting slot 160 and eject a recording medium from the recording medium inserting slot 160;

a locking portion 400 for fastening the other edge of said rotating plate 200 when said recording medium inserting slot 160 is closed by said rotating plate 200 to prevent a rotation of said rotating plate 200 and to firmly connect said rotating plate 200 with said escutcheon 100 of said car audio; and a detaching portion 500 installed on the rear face of said rotating plate 200 and for detachably connecting the panel 300 with said rotating plate 200 due to an elastic force and a restoration force of the detaching portion 500;

wherein said locking portion 400 comprises:
   a supporting member 420 for fixing said locking portion 400 at a boss 112 formed on a rear face of said escutcheon 100;
   a pushed member 440 contacted with one face of said supporting member 420 and movably connected with and separately operated with said supporting member 420;
   a cover 460 for accommodating said supporting member 420 and said pushed member 440 and having its one side connected with said pushed member 440, so that said cover 460 is rotated according to the rotation of said pushed member 440;
   a locking member 480 secured to the other side of said cover 460 and for fastening said rotating plate 200 according to the rotation of said cover 460; and
   an elastic member 490 secured to one side of said supporting member 420 and one side of said cover 460 and for returning said locking member 400 to original position when said rotating plate 200 is released from said locking member 400.

10. An apparatus for opening and detaching a panel comprising:

a rotating plate 200 having an edge connected with an escutcheon 100 and rotating integrally with a panel 300 centering on an axis like the connected edge, said rotating plate 200 is detachably connected with a rear face of said panel 300 for opening and closing a recording medium inserting slot 160 of a car audio in order to insert a recording medium into the recording medium inserting slot 160 and eject a recording medium from the recording medium inserting slot 160;

a locking portion 400 for fastening the other edge of said rotating plate 200 when said recording medium inserting slot 160 is closed by said rotating plate 200 to prevent a rotation of said rotating plate 200 and to firmly connect said rotating plate 200 with said escutcheon 100 of said car audio; and a detaching portion 500 installed on the rear face of said rotating plate 200 and for detachably connecting said panel 300 with said rotating plate 200 due to an elastic force and a restoration force of the detaching portion 500;

wherein said detaching portion 500 comprises:
   a pushed part 520 urged by a detachment knob 340 to release said panel 300 from said rotating plate 200;
   fixing members 540 integrally formed with the upper and lower parts of said pushed part 520 and for fastening said panel 300 to said rotating plate 200 by hooking said panel 300;
   supporting portions 560 integrally formed with said fixing members 540 to receive a detaching portion for fixing shaft 590 and for fixing said detaching portion 500 at said rotating plate 200; and
   a spring member 580 installed between said supporting portions 560 to receive said detaching portion fixing shaft 590 therein and to urge the rear faces of said pushed part 520 and said rotating plate 200 and for returning said fixing members 580 to the original position when said panel 300 is detached from said rotating plate 200;

wherein said locking portion 400 comprises:
   a supporting member 420 for fixing said locking portion 400 at a boss 112 formed on a rear face of said escutcheon 100;
   a pushed member 440 contacted with one face of said supporting member 420 and movably connected with and separately operated with said supporting member 420;
   a cover 460 for accommodating said supporting member 420 and said pushed member 440 and having its one side connected with said pushed member 440, so that said cover 460 is rotated according to the rotation of said pushed member 440;
   a locking member 480 secured to the other side of said cover 460 and for fastening said rotating plate 200 according to the rotation of said cover 460; and
   an elastic member 490 secured to one side of said supporting member 420 and one side of said cover 460 and for returning said locking member 400 to original position when said rotating plate 200 is released from said locking member 400.

* * * * *